(12) United States Patent
Libal et al.

(10) Patent No.: US 9,208,156 B2
(45) Date of Patent: Dec. 8, 2015

(54) ACQUIRING STATISTICAL ACCESS MODELS

(75) Inventors: Vit Libal, Praha (CZ); Valerie Guralnik, Mound, MN (US)

(73) Assignee: Honeywell International Inc., Morristown, NJ (US)

(*) Notice: Subject to any disclaimer, the term of this patent is extended or adjusted under 35 U.S.C. 154(b) by 634 days.

(21) Appl. No.: 13/312,579

(22) Filed: Dec. 6, 2011

(65) Prior Publication Data
US 2013/0144914 A1   Jun. 6, 2013

(51) Int. Cl.
*G06F 17/30* (2006.01)

(52) U.S. Cl.
CPC .......... *G06F 17/30029* (2013.01); *G06F 17/30* (2013.01); *G06F 17/30165* (2013.01)

(58) Field of Classification Search
None
See application file for complete search history.

(56) References Cited

U.S. PATENT DOCUMENTS

| | | | |
|---|---|---|---|
| 6,442,519 B1 | 8/2002 | Kanevsky et al. | |
| 2006/0277184 A1* | 12/2006 | Faitelson et al. | 707/9 |
| 2007/0250370 A1* | 10/2007 | Partridge et al. | 705/8 |
| 2007/0260716 A1* | 11/2007 | Gnanasambandam et al. | 709/223 |
| 2008/0262985 A1* | 10/2008 | Cretu et al. | 706/12 |
| 2011/0082824 A1* | 4/2011 | Allison et al. | 706/20 |

* cited by examiner

*Primary Examiner* — Son T Hoang
(74) *Attorney, Agent, or Firm* — Brooks, Cameron & Huebsch, PLLC

(57) ABSTRACT

One or more embodiments include collecting data associated with a first access profile, collecting data associated with a second access profile, determining whether the data associated with the first access profile has a particular number of characteristics in common with the data associated with the second access profile, assigning a statistical access model associated with the second access profile to the first access profile based on the particular number of characteristics that the data associated with first access profile has in common with the data associated with the second access profile, and detecting an anomalous access event based on the statistical access model.

18 Claims, 3 Drawing Sheets

ACQUIRING STATISTICAL ACCESS MODELS

TECHNICAL FIELD

The present disclosure relates to methods, devices, and computer-readable media for acquiring statistical access models.

BACKGROUND

Access control systems can be used to exert control over who can interact with a resource. For example, an access control system can be implemented to control access to resources such as buildings, rooms, and/or computers. Some access control systems can detect an access event, such as for example, an individual accessing a location. These systems can further detect whether the access event is an anomalous (e.g., abnormal, unusual, and/or unexpected) access event using data associated with the access event (e.g., time of the access event) and comparing the data to a statistical access model associated with a number of non-anomalous (e.g., normal, usual, and/or expected) access events associated with the location. The statistical access model can, for example, be built from historical data that includes access events associated with an individual.

Acquiring enough data to build the statistical access model, however, can be challenging. For instance, if a new employee is hired, a significant amount of time may surpass before enough data can be collected to build the statistical access model. During this time, the access control system may not be able to correctly detect the anomalous access event.

DETAILED DESCRIPTION

Figure 1:
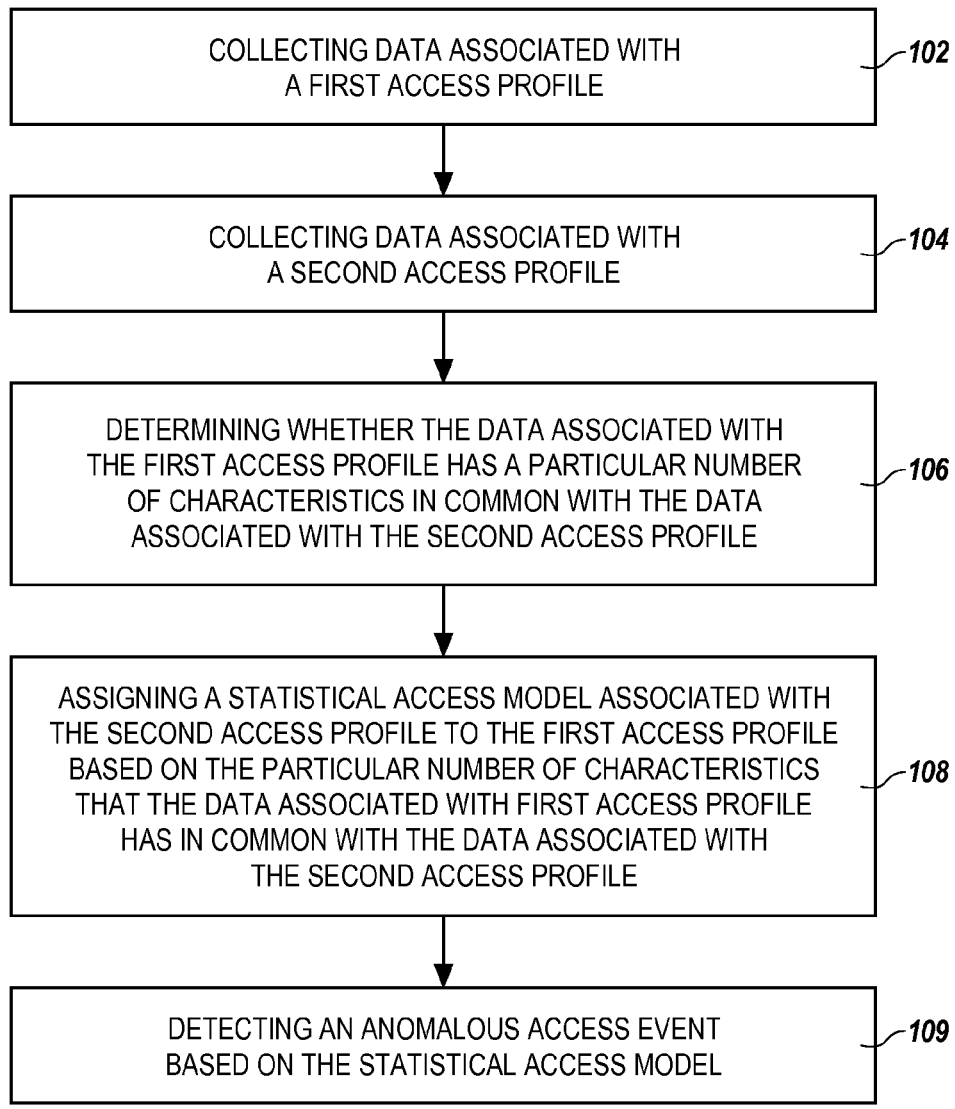
FIG. 1 illustrates a method for acquiring statistical access models according to one or more embodiments of the present disclosure.

The present disclosure provides methods, devices, and computer-readable media for acquiring statistical access models. One or more embodiments include collecting data associated with a first access profile, collecting data associated with a second access profile, determining whether the data associated with the first access profile has a particular number of characteristics in common with the data associated with the second access profile, assigning a statistical access model associated with the second access profile to the first access profile based on the particular number of characteristics that the data associated with first access profile has in common with the data associated with the second access profile, and detecting an anomalous access event based on the statistical access model.

Some embodiments of the present disclosure can result in an increased reliability of anomaly detection and a decreased time needed to assign a statistical access model to an individual, a group of individuals, an access control device, and/or a group of access control devices. The statistical access model can be used to determine whether an access event is an anomalous access event and/or a non-anomalous access event.

Alternatively, and/or in addition, the statistical access model can be used for classifying access event types and/or classifying behavior patterns of access system users. For example, access event types can be separated and/or grouped into event types such as for example, maintenance event types (e.g., maintenance personnel accessing areas), cleaning access event types (e.g., janitorial staff accessing areas), and/or project access events (e.g., project team members accessing areas), although examples are not so limited. Classifying behavior patterns of access system users can include separating and/or grouping user behavior patterns based on their interaction with the access system.

Building the statistical access model, however, can require a large amount of data, which can take days, weeks, and/or months to collect, for example. The present disclosure can make use of an existing statistical access model to assign a statistical access model to an individual, a group of individuals, an access control device, and/or a group of access control devices.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

FIG. 1 illustrates a method for acquiring statistical access models according to one or more embodiments of the present disclosure. The method can be performed by, for example, the device further described herein in connection with FIG. 3.

At block 102, the method includes collecting data associated with a first access profile. The method includes collecting data associated with a second access profile, at block 104. The first access profile and/or second access profile can be of an individual, a group of individuals, an access control device, and/or a group of access control devices.

Accordingly, in some embodiments, the method can include collecting data associated with a first access profile of a first individual and/or first group of individuals and collecting data associated with a second access profile of a second individual and/or a second group of individuals, for example. Alternatively, and/or in addition, the method can include collecting data associated with a first access profile of a first access control device and/or a first group of access control devices and collecting data associated with a second access profile of a second access control device and/or a second group of access control devices.

In some embodiments, the method can include collecting data associated with combinations of individuals and access control devices. For example, the method can include collecting data associated with a first access profile of a first individual and/or first group of individuals and collecting data associated with a second access profile of a second access control device and/or a second group of access control devices.

An access profile can be defined as access data, identification data, and other types of data associated with an individual, group of individuals, access control device, and/or group of access control devices. The data associated with the first and/or second access profile can include a time of an access event (e.g., the time of day the access event occurs); a duration of the access event (e.g., how long an individual and/or group of individuals are in a location); a day of the access event (e.g., the date and/or day of the week the access event occurs); an identification of an individual and/or access control device associated with the access event; a time of a first access event associated with a location (e.g., the time of day the location is first accessed); and/or a frequency of access events associated with the location, although examples are not so limited.

Alternatively and/or in addition, the first and/or second access profile can include data specific to the individual and/or access control device. For instance, the first and/or second access profile can include a job title of the individual and/or a job title of the individual that works in the location that the access control device is employed; a job description of the individual and/or the job that is performed by the individual in the location that the access control device is employed; and/or a project description and/or description of the project that is being worked on in the location that the access control device is employed, although examples are not so limited.

At block 106, the method includes determining whether the data associated with the first access profile has a particular number of characteristics in common with the data associated with the second access profile. This can include comparing the data associated with the first access profile to the data associated with the second access profile. In an example, data associated with a first access profile of an individual who is a new employee (e.g., has been employed for a week) can be compared with data associated with a second access profile of a group of individuals who have been employees for a longer period of time than the individual who is the new employee (e.g., have been employees for periods of time between 6 months and 5 years).

In some embodiments, a statistic can be calculated from numerical data associated with the first and/or second profiles and can be used in performing the comparison. In an example, an amount of data can be collected on a time of an access event associated with the new employee such as data associated with the access event occurring when the new employee arrives at work.

For instance, if the new employee arrives at work at 7:45 am, 7:55 am, 7:50 am, 7:47 am, and 7:58 am on Monday, Tuesday, Wednesday, Thursday, and Friday, respectively; this data can be compared to related data associated with the second access profile of the group of individuals that have been employees for a longer period of time than the individual. The comparison of the data can be performed by calculating a statistic from the data, for example, through a mean value and/or variance, although examples are not so limited. Similarly, data can be collected on duration of the access event, the date of the access event, the time of the first access event associated with the location, and/or the frequency of access events associated with the location and statistics can be calculated from such data, for example.

Based on the comparison, a determination can be made whether the data associated with the first access profile (e.g., access event associated with the new employee) has a particular number of characteristics in common with the data associated with the second access profile (e.g., access event associated with the group of individuals that have been employed for a longer period of time than the individual). For example, an average arrival time of 7:51 am can be calculated for the new employee. If the average arrival time of the new employee is within a predetermined threshold of the average arrival time of the group of individuals that have been employed for a longer time than the individual, it can be determined that the data associated with the first access profile has a characteristic (e.g., arrival time) in common with the data associated with the second access profile.

Alternatively, and/or in addition, the data that includes, for example, the job title of the individual, the job description of the individual, and/or the project description associated with the first and/or second access profile can be compared between the first and second access profiles. For example, a job title associated with a first access profile of a newly employed janitor (e.g., janitor) can be compared to a job title associated with a second access profile of a group of janitors that have been employed as janitors for a longer period of time than the newly employed janitor. Based on the comparison, a determination can be made whether the data associated with the first access profile (e.g., a job title of janitor assigned to the new employee) has a particular number of characteristics in common with the data associated with the second access profile (e.g., a job title of janitor assigned to the group of individuals that have been employed for a longer period of time than the individual).

The method, at block 108, includes assigning a statistical access model associated with the second access profile to the first access profile based on the particular number of characteristics that the data associated with the first access profile has in common with the data associated with the second access profile. The statistical access model can, for example, be built (e.g., created) using historical data associated with access events (e.g., the number of access events) associated with a location, an individual, an access control device, a group of locations, a group of individuals, and/or a group of access control devices. That is, the statistical access model can be built using data associated with previous access events associated with the location, the individual, a group of locations, and/or a group of individuals, among other suitable data for building the model.

In some embodiments, the method can include assigning a statistical access model associated with the group of individuals to the first individual when the data associated with the first access profile of the first individual has a particular number of characteristics in common with the data associated with the second access profile of the group of individuals. Assigning the statistical access model associated with the group of individuals to the first individual can result in advantages over building a statistical access model for the first individual, such as a reduction in time need to build a statistical access model for the first individual. Further, assigning the statistical access model associated with the group of individuals to the first individual can result in an increase in reliability as opposed to creating a statistical access model for the individual based on a limited amount of data.

For example, an individual may be working on multiple projects with multiple groups. As such, a first portion of the access profile of the individual may be similar to a first group of individuals working on a first project and a second portion of the access profile of the individual may be different than the first group of individuals working on the first project, but similar to a second group of individuals working on a second project. Accordingly, a first statistical access model associated with the first group of individuals can be assigned to the individual and a second statistical access model associated with the second group of individuals can also be assigned to the individual.

In some embodiments, a determination can be made as to when to apply a particular one of various statistical access models assigned to the individual. For example, should an individual work with the first group of individuals in the morning of each day in the week and work with the second group of individuals in the afternoon of each day in the week, the first statistical access model can be applied to the individual in the morning and the second statistical access model can be applied to the individual in the afternoon.

Where a determination cannot be made as to when a particular one of various statistical access models should be applied to the individual, the first statistical access model and the second statistical access model can be merged. In an example, the first statistical access model and the second statistical access model can be merged by taking an average between the data that forms the first statistical access model and the second statistical access model.

Alternatively, and/or in addition, the method can include assigning a statistical access model associated with a second individual to the first individual when the data associated with the first access profile of the first individual has a particular number of characteristics in common with the data associated with the second access profile of the second individual. In an example, the second individual may be dissimilar to one or more existing groups and can have a statistical access model assigned to him or her. If the data associated with the first access profile of the first individual shares at least a portion of data that is common between the first access profile and the second access profile of the second individual, the statistical access model associated with the second individual can be assigned to the first individual.

Based on the statistical access model, an anomalous access event can be detected, at block 109. In an example, data associated with the anomalous access event can be compared to data associated with a statistical access model associated with a number of non-anomalous access events associated with a location.

In some embodiments, the method can include providing a notification that the anomalous access event has occurred based on the detection of the anomalous access event. For example, a notification (e.g., alert) can be provided to an operator that the anomalous access event has occurred. In some embodiments, the method can include creating a merged statistical access model by merging the first access profile of the first individual with the second access profile of the second individual when the data associated with the first access profile of the first individual has a particular number of characteristics in common with the data associated with the second access profile of the second individual. Rather than assigning the statistical access model associated with the second individual to the first individual, a new statistical access model can be formed from the data associated with the first access profile of the first individual and the data associated with the second access profile of the second individual.

Figure 2:
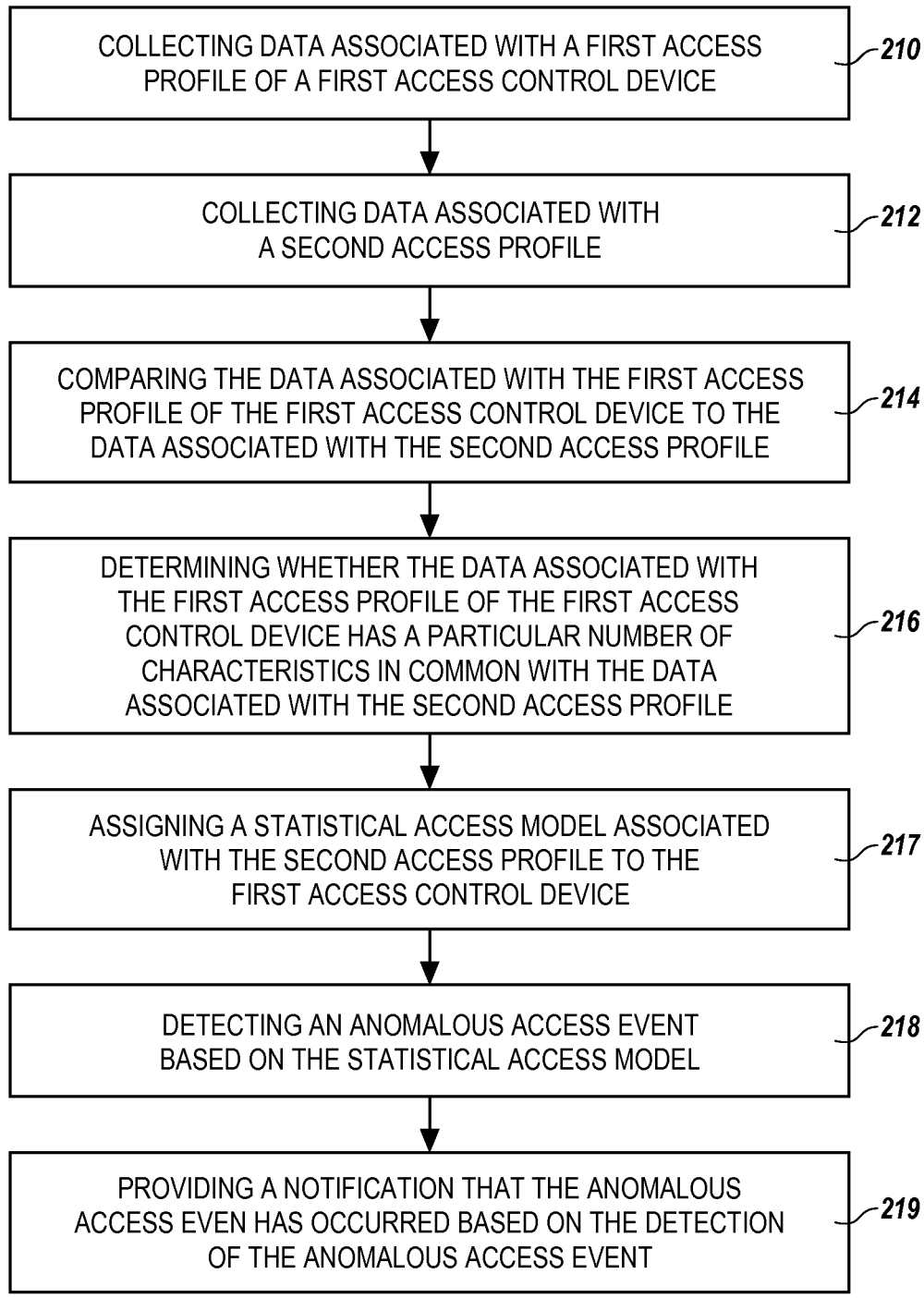
FIG. 2 illustrates a method for acquiring statistical access models according to one or more embodiments of the present disclosure.

FIG. 2 illustrates a method for acquiring statistical access models according to one or more embodiments of the present disclosure. The method includes collecting data associated with a first access profile of a first access control device, at block 210. The access control device can be an existing or newly installed reader (e.g., placed at an entrance to a location), that reads an identification token (e.g., key card, magnetic badge, wireless identification tag, etc.).

The method, at block 212 includes collecting data associated with a second access profile. The second access profile can be of an access control device, and/or a group of access control devices. In an example, the method can include collecting data associated with a second access profile of a second access control device. For instance, the method can include collecting data on a location of the first access control device and the second access control device and/or access events associated with the first access control device and the second access control device.

In a manner analogous to that discussed in relation to FIG. 1, the method includes comparing the data associated with the first access profile of the first access control device to the data associated with the second access profile, at block 214. In an example, a comparison can be made between the location of the first access control device and the second access control device.

The method includes, at block 216, determining whether the data associated with the first access profile of the first access control device has a particular number of characteristics in common with the data associated with the second access profile. In an example, the determination can be based on the comparison of the data associated with the first access profile of the first access control device and the data associated with the second access profile. For instance, if the first access control device and the second access control device are each located at entries of a common laboratory, a determination can be made that the first access profile of the first access control device and the second access profile of the second access control device have a particular characteristic in common (e.g., located at entries of a common laboratory).

At block 217, the method includes assigning a statistical access model associated with the second access profile to the first access control device. For example, the second access control device can be an existing access control device that has had a statistical access model associated with and/or built for the access control device and the first access control device can be a newly installed access control device that has no data or limited data associated with the first access profile of the first access control device. Assigning the statistical access model associated with the second access profile of the second access control device to the first access control device can result in a statistical access model being associated with the first access control model in a lesser amount of time that it would take to build a statistical access model for the first access control device.

In some embodiments, at block 218, an anomalous access event can be detected based on the statistical access model. Based on the detection of the anomalous access event, an alert can be provided that the anomalous access event has occurred at block 219.

Figure 3:
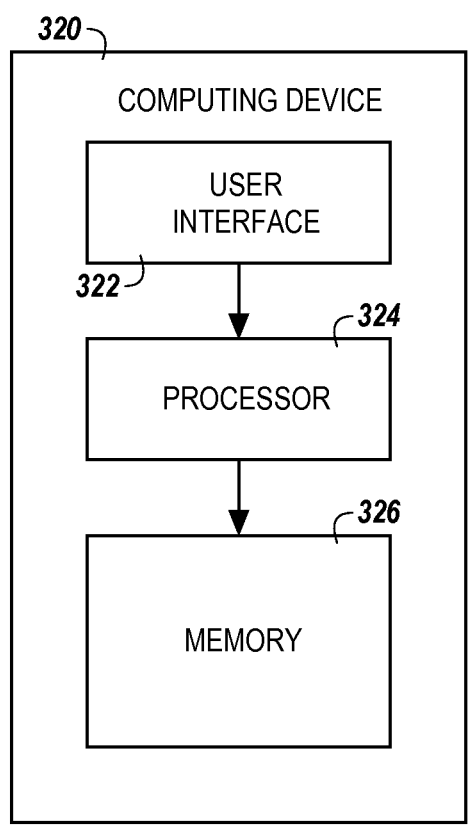
FIG. 3 illustrates a computing device for acquiring statistical access models according to one or more embodiments of the present disclosure.

FIG. 3 illustrates a computing device for acquiring statistical access models according to one or more embodiments of the present disclosure. Computing device 320 can be, for example, a desktop computing device, a laptop computing device, or a portable handheld computing device, such as, for instance, a portable handheld mobile phone, media player, or scanner. However, embodiments of the present disclosure are not limited to a particular type of computing device.

In some embodiments, computing device 320 can be a part of an access control and/or monitoring system. For example, computing device 320 can be part of an access control device (e.g., card reader).

As shown in FIG. 3, computing device 320 includes a user interface 322. User interface 322 can be a graphic user interface (GUI) that can provide (e.g., display and/or present) and/or receive information (e.g., data and/or images) to and/ or from a user (e.g., operator) of computing device 320. For example, user interface 322 can include a screen that can provide information to a user of computing device 320 and/or receive information entered into a display on the screen by the user. However, embodiments of the present disclosure are not limited to a particular type of user interface.

As shown in FIG. 3, computing device 320 includes a processor 324 and a memory 326 coupled to the processor 324. Memory 326 can be volatile or nonvolatile memory. Memory 326 can also be removable (e.g., portable) memory, or non-removable (e.g., internal) memory. For example, memory 326 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 326 is illustrated as being located in computing device 320, embodiments of the present disclosure are not so limited. For example, memory 326 can also be located internal to another computing resource (e.g., enabling computer readable instructions to be downloaded over the Internet or another wired or wireless connection).

Memory 326 can also store executable instructions, such as, for example, computer readable instructions (e.g., software), for acquiring statistical access models in accordance with one or more embodiments of is the present disclosure.

Processor 324 can execute the executable instructions stored in memory 326 to acquire statistical access models in accordance with one or more embodiments of the present disclosure. For example, processor 324 can execute the executable instructions stored in memory 326 to collect data associated with a first access profile of a first individual and collect data associated with a second access profile of a second individual.

In some embodiments, the instructions can be executed to compare the data associated with the first access profile of the first individual to the data associated with the second access profile of the second individual. In an example, a job title associated with the first access profile of the first individual can be compared to a job title associated with the second access profile of the second individual. For instance, the first individual and the second individual may share a job title of systems analyst.

In some embodiments, instructions can be executed to determine that the data associated with the first access profile of the first individual has a particular number of characteristics in common with the data associated with the second access profile of the second individual. In the above example, the determination that the first access profile of the first individual shares a common characteristic with the second access profile of the second individual of a job title (e.g., systems analyst) may be made. A determination can further be made that the individuals share a common characteristic of first accessing a particular location within a building between 7:30 am and 8:00 am each morning.

In some embodiments, instructions can be executed to merge the first access profile of the first individual with the second access profile of the second individual to create a merged access profile based on the particular number of characteristics that the data associated with the first access profile of the first individual has in common with the data associated with the second access profile of the second individual. In an example, the access profiles can be merged by combining data points of each respective access profile. For instance, if the first individual first accesses the particular location at times between 7:30 am and 7:37 am each morning and the second individual first accesses the particular location at times between 7:45 am and 8:00 am each morning, the time of each particular first access event for the first individual and the second individual can be combined to form the merged access profile. The merged access profile, therefore, can contain data points relating to the times associated with the first access events (e.g., times between 7:30 am and 7:37 am and times between 7:45 am and 8:00 am) as well as the job titles of the individuals (e.g., systems analyst).

A merged statistical access model can then be created from the merged access profile. The merged statistical access model can be created by associating a portion of the data of the merged access profile with a number of non-anomalous access events. For example, the time associated with the first access events can be associated with non-anomalous access events. Upon implementation of the merged statistical access model, instructions can be executed to detect an anomalous access event based on the statistical access model. As a result of the detection of the anomalous access event, instructions can be executed to provide a notification (e.g., alert) to an operator that the anomalous access event has occurred.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for acquiring statistical access models, comprising:
collecting data associated with a first access profile for a first group of users that includes a designated user, wherein the first group of users is distinct from a second group of users;
collecting data associated with a second access profile for the second group of users;
comparing the data associated with the first access profile to the data associated with the second access profile, wherein the data includes a job title associated with the first access profile and a job title associated with the second access profile respectively;

determining whether the data associated with the first access profile has a particular number of characteristics in common with the data associated with the second access profile;

determining a first statistical access model based on the first access profile and a second statistical access model based on the second access profile;

merging the first statistical access model and the second statistical access model into a merged statistical access model in response to a determination that the data associated with the first access profile has the particular number of characteristics in common with the data associated with the second access profile;

assigning the merged statistical access model to the first access profile for the designated user; and detecting an anomalous access event of the designated user based on the merged statistical access model.

2. The method of claim 1, wherein the merging the first statistical access model and the second statistical access model includes merging the first statistical access model to represent a first portion of a time period represented by the merged statistical access model and merging the second statistical access model to represent a second portion of a time period represented by the merged statistical access model.

3. The method of claim 1, wherein the collecting data associated with the first access profile includes collecting data associated with a first access profile of a first individual.

4. The method of claim 3, wherein the collecting data associated with the second access profile includes collecting data associated with a second access profile of a group of individuals.

5. The method of claim 4, wherein the method further includes assigning a statistical access model associated with the group of individuals to the first individual when the data associated with the first access profile of the first individual has a particular number of characteristics in common with the data associated with the second access profile of the group of individuals.

6. The method of claim 3, wherein the collecting data associated with the second access profile includes collecting data associated with a second access profile of a second individual.

7. The method of claim 6, wherein the method includes assigning a statistical access model associated with the second individual to the first individual when the data associated with the first access profile of the first individual has a particular number of characteristics in common with the data associated with the second access profile of the second individual.

8. The method of claim 6, wherein the method includes creating the merged statistical access model by merging the first access profile of the first individual with the second access profile of the second individual when the data associated with the first access profile of the first individual has a particular number of characteristics in common with the data associated with the second access profile of the second individual.

9. The method of claim 1, wherein the collecting data associated with the first access profile includes collecting data associated with a first access profile of an access control device.

10. The method of claim 1, wherein the collecting data associated with the second access profile includes collecting data associated with a second profile of a group of access control devices.

11. The method of claim 1, wherein the collecting data associated with the first access profile and the second access profile includes collecting at least one of:
a time of an access event;
a duration of the access event;
a day of the access event;
an identification of an individual associated with the access event;
a time of a first access event associated with a location; and
a frequency of access events associated with the location.

12. A computer-readable non-transitory medium storing instructions for acquiring statistical access models, executable by a computer to cause the computer to:
collect data associated with a first access profile of a first individual;
collect data associated with a second access profile of a second individual, wherein the first individual is distinct from the second individual;
compare the data associated with the first access profile of the first individual to the data associated with the second access profile of the second individual, wherein the data includes a job title associated with the first access profile of the first individual to and a job title associated with the second access profile of the second individual respectively;
determine that the data associated with the first access profile of the first individual has a particular number of characteristics in common with the data associated with the second access profile of the second individual;
merge the first access profile of the first individual with the second access profile of the second individual to create a merged access profile based on the particular number of characteristics that the data associated with the first access profile of the first individual has in common with the data associated with the second access profile of the second individual; and
create a merged statistical access model from the merged access profile and assign the merged statistical access model to the first individual and the second individual.

13. The computer-readable non-transitory medium of claim 12, wherein the instructions include instructions executable by the computer to detect an anomalous access event based on the merged statistical access model and provide an alert that an anomalous access event has occurred.

14. A method for acquiring statistical access models, comprising:
collecting data associated with a first access profile of a first access control device for a designated user;
collecting data associated with a second access profile, wherein the second access profile is distinct from the first access profile;
comparing the data associated with the first access profile of the first access control device to the data associated with the second access profile, wherein the data includes a job title associated with the first access profile toe and a job title associated with the second access profile respectively;
determining whether the data associated with the first access profile of the first access control device has a particular number of characteristics in common with the data associated with the second access profile;
determining a first statistical access model based on the first access profile and a second statistical access model based on the second access profile;
merging the first statistical access model and the second statistical access model into a merged statistical access model in response to a determination that the data associated with the first access profile of the first access control device has the particular number of characteristics in common with the data associated with the second access profile;
assigning the merged statistical access model to the first access control device for the designated user;
detecting an anomalous access event of the designated user based on the merged statistical access model; and
providing a notification that the anomalous access even has occurred based on the detection of the anomalous access event.

15. The method of claim 14, wherein the collecting data associated with the second access profile includes collecting data associated with a second access profile of a second access control device.

16. The method of claim 15, wherein the collecting data associated with the first access profile of the first access control device and the second access profile of the second access control device includes collecting data on a location of the first access control device and a location of the second access control device.

17. The method of claim 15, wherein the collecting data associated with the first access profile of the first access control device and the second access profile of the second access control device includes collecting data on access events associated with the first access control device and the second access control device.

18. The method of claim 14, wherein the collecting data associated with the second access profile includes collecting data associated with a second access profile of a group of access control devices.

* * * * *